US012797711B2

(12) United States Patent
Ko

(10) Patent No.: US 12,797,711 B2
(45) Date of Patent: Nov. 17, 2026

(54) TELEVISION, MOTION SENSING FAN ASSEMBLY, CONTROL METHOD, AND NON-TRANSITORY COMPUTER READABLE STORAGE MEDIUM

(71) Applicant: AmTRAN Technology Co., Ltd., New Taipei City (TW)

(72) Inventor: Ming-Tsung Ko, New Taipei City (TW)

(73) Assignee: AmTRAN Technology Co., Ltd., New Taipei City (TW)

( * ) Notice: Subject to any disclaimer, the term of this patent is extended or adjusted under 35 U.S.C. 154(b) by 694 days.

(21) Appl. No.: 18/323,404

(22) Filed: May 24, 2023

(65) Prior Publication Data

US 2024/0261659 A1 Aug. 8, 2024

(30) Foreign Application Priority Data

Feb. 4, 2023 (TW) ................................ 112104026

(51) Int. Cl.

| | |
|---|---|
| ***A63B 71/06*** | (2006.01) |
| ***A63B 22/06*** | (2006.01) |
| ***F04D 27/00*** | (2006.01) |
| ***G06T 19/00*** | (2011.01) |
| ***H04N 21/422*** | (2011.01) |
| ***H04N 21/426*** | (2011.01) |

(52) U.S. Cl.

CPC ...... *A63B 71/0622* (2013.01); *A63B 22/0605* (2013.01); *F04D 27/004* (2013.01); *G06T 19/006* (2013.01); *H04N 21/42201* (2013.01); *H04N 21/42202* (2013.01); *H04N 21/426* (2013.01)

(58) Field of Classification Search

CPC ............ A63B 71/0622; A63B 22/0605; A63B 2071/0655; A63B 2071/0658; A63B 2220/34; A63B 2220/70; A63B 2220/76; A63B 2220/78; A63B 2220/803; A63B 2220/89; A63B 2225/50; A63B 22/02; A63B 69/16; H04N 21/42201; H04N 21/42202; H04N 21/426; G06T 19/006; F04D 27/004

See application file for complete search history.

(56) References Cited

U.S. PATENT DOCUMENTS 12,053,685 B2 * 8/2024 Lockhart ............ A63B 71/0622
12,343,589 B1 * 7/2025 Bishop ................... A63B 22/02
(Continued)

FOREIGN PATENT DOCUMENTS

CN 201889023 U 7/2011
CN 104879884 B 3/2018
(Continued)

*Primary Examiner* — Rami R Okasha
(74) *Attorney, Agent, or Firm* — CKC & Partners Co., LLC

(57) ABSTRACT

A television includes a processor, a display panel, and a motion sensing fan module. The display panel is configured to display an image. The motion sensing fan module is configured to provide airflow to the front of the television, and sense a motion of a user so as to generate at least one sensing signal to the processor. The processor is configured to control air volume of the airflow provided by the motion sensing fan module based on the at least one sensing signal.

18 Claims, 18 Drawing Sheets

(56) References Cited

U.S. PATENT DOCUMENTS

2010/0035726 A1* 2/2010 Fisher ................ A63B 24/0084 482/8
2010/0227542 A1* 9/2010 Goldmann .............. F24F 1/022 454/258
2013/0035208 A1* 2/2013 Dalebout ............... A63B 22/02 482/8
2013/0178337 A1* 7/2013 Brammer ............... A63B 22/02 482/9
2013/0274067 A1* 10/2013 Watterson ............ A63B 22/203 482/5
2014/0243156 A1 8/2014 Cohen
2014/0274564 A1* 9/2014 Greenbaum ......... A63B 21/225 482/5
2015/0246260 A1* 9/2015 Giannelli ........... A63B 23/0476 482/8
2015/0290490 A1 10/2015 Badarneh
2016/0129301 A1* 5/2016 Giannelli ........... A63B 22/0015 482/51
2016/0213976 A1* 7/2016 So ...................... A63B 71/0622
2018/0021629 A1* 1/2018 DeLuca ........... A63B 21/00069 482/4
2019/0079480 A1* 3/2019 Sun .......................... G08B 6/00
2020/0264703 A1* 8/2020 Leake ..................... G06F 3/011
2022/0280857 A1* 9/2022 Watterson ............ H04N 5/2228
2022/0314078 A1* 10/2022 Watterson .............. A63B 22/02
2022/0413614 A1* 12/2022 Gilg ...................... G06F 40/221
2024/0185532 A1* 6/2024 Da .......................... G06F 3/012
2024/0245956 A1* 7/2024 Levitian .................. G06T 13/40

FOREIGN PATENT DOCUMENTS

CN 107952215 A 4/2018
CN 112797268 A 5/2021
CN 115634422 A 1/2023
TW 201209532 A 3/2012
TW 201301078 A 1/2013
TW I698266 B 7/2020
TW 727654 B 5/2021

* cited by examiner

TELEVISION, MOTION SENSING FAN ASSEMBLY, CONTROL METHOD, AND NON-TRANSITORY COMPUTER READABLE STORAGE MEDIUM

CROSS-REFERENCE TO RELATED APPLICATION

This application claims priority to Taiwan application Ser. No. 11/210,4026 filed Feb. 4, 2023, the disclosures of which are incorporated herein by reference in their entireties.

BACKGROUND

Field of Invention

The present disclosure relates to a device, a method, and a computer readable medium. More particularly, the present disclosure relates to a television, a motion sensing fan assembly, a control method, and a computer readable medium.

Description of Related Art

With the popularity of the exercise, cycling outdoors is one of the entertainments for people. However, it is prone to rain in Taiwan. If it's raining, cycling outdoors will be affected. Therefore, it is an urgent need for industry to find out a solution.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

The present disclosure provides a television, and the television includes a processor, a display panel, and a motion sensing fan module. The display panel is coupled to the processor, and configured to display an image. The motion sensing fan module is configured to provide an airflow to a front of the television, and sense a motion of a user to generate at least one sensing signal to the processor. The processor is configured to control an air volume of the airflow provided by the motion sensing fan module based on the at least one sensing signal.

In some embodiments, the motion sensing fan module includes a plurality of sensors, a driving circuit, and a fan. The plurality of sensors are coupled to the processor, and configured to respectively sense the motion of the user. When one of the plurality of sensors senses the motion of the user, a sensing signal is correspondingly outputted to the processor. The processor correspondingly generates a rotational speed control signal based on a number of the sensing signal obtained by the processor. The driving circuit is coupled to the processor, and configured to receive the rotational speed control signal. The fan is coupled to the driving circuit, and configured to be driven by the driving circuit to generate the airflow. The driving circuit determines a rotational speed of the fan based on the rotational speed control signal.

In some embodiments, the processor further outputs a laser beam control signal. The motion sensing fan module includes a laser device coupled to the processor so as to project a plurality of laser beams to display a motion area based on the laser beam control signal.

In some embodiments, the processor further outputs a light control signal. The motion sensing fan module further includes an atmosphere lamp coupled to the processor, so as to emit an atmosphere light based on the light control signal.

In some embodiments, the television further incudes at least one environment sensor. The at least one environment sensor is coupled to the processor, and configured to sense the motion of the user to output at least one environment sensing signal to the processor. The processor correspondingly generates the rotational speed control signal to the driving circuit based on the at least one environment sensing signal, and make the driving circuit control the rotational speed of the fan based on the rotational speed control signal.

In some embodiments, the at least one environment sensor includes at least one of a rotational speed sensor and a vibration sensor.

In some embodiments, the at least one environment sensor transmits the at least one environment sensing signal to the processor through a wired manner or a wireless manner.

The present disclosure provides a motion sensing fan assembly including a plurality of sensors, a controller, a driving circuit, and a fan. The plurality of sensors are configured to sense a motion of a user, and correspondingly output a sensing signal when one of the plurality of sensors senses the motion of the user. The controller is coupled to the plurality of sensors, and the configured to correspondingly output a rotational speed control signal based on a number of the sensing signal(s) obtained by the controller. The driving circuit is coupled to the controller, and the driving circuit is configured to receive the rotational speed control signal. The fan is coupled to the driving circuit, and the fan is configured to be driven by the driving circuit to rotate and provide an airflow. The driving circuit determines an air volume of the airflow provided by the fan based on the rotational speed control signal.

In some embodiments, the controller further outputs a laser beam control signal, and the motion sensing fan assembly further includes a laser device. The laser device is coupled to the controller, and the laser device is configured to project a plurality of laser beams to display a motion area based on the laser beam control signal.

In some embodiments, the controller further outputs a light control signal, and the motion sensing fan assembly further includes an atmosphere lamp. The atmosphere lamp is coupled to the controller, and the atmosphere lamp is configured to emit an atmosphere light based on the light control signal.

The present disclosure provides a control method is configured to control a television. The television includes a processor, a display panel, and a motion sensing fan module, where the processor is coupled to the display panel and the motion sensing fan module. The control method includes the following steps: displaying an image by the display panel; providing an airflow to a front of the television and sensing a motion of a user to generate at least one sensing signal to the processor by the motion sensing fan module; and controlling an air volume of the airflow provided by the motion sensing fan module based on the at least one sensing signal by the processor.

In some embodiments, the step of providing the airflow to the front of the television and sensing the motion of the user to generate the at least one sensing signal to the processor by the motion sensing fan module includes the following steps:

respectively sensing the motion of the user by a plurality of sensors of the motion sensing fan module, and correspondingly outputting a sensing signal to the processor when one of the plurality of sensors senses the motion of the user; correspondingly generating, by the processor, a rotational speed control signal based on a number of the sensing signal(s) obtained by the processor; and determining a rotational speed of a fan of the motion sensing fan module based on the rotational speed control signal by a driving circuit of the motion sensing fan module.

In some embodiments, the control method further includes the following steps: outputting a laser beam control signal by the processor; and projecting a plurality of laser beams to display a motion area based on the laser beam control signal by a laser device of the motion sensing fan module.

In some embodiments, the control method further includes the following steps: sensing the motion of the user by at least one environment sensor to output at least one environment sensing signal to the processor; and correspondingly generating the rotational speed control signal to the driving circuit based on the at least one environment sensing signal by the processor, and making the driving circuit control the rotational speed of the fan based on the rotational speed control signal.

In some embodiments, the at least one environment sensor includes at least one of a rotational speed sensor and a vibration sensor.

In some embodiments, the at least one environment sensor transmits the at least one environment sensing signal to the processor through a wired manner or a wireless manner.

The present disclosure provides a non-transitory computer readable storage medium storing a computer program for performing a control method. The control method is configured to control a television. The television includes a processor, a display panel, and a motion sensing fan module. The processor is coupled to the display panel and the motion sensing fan module. The control method includes the following steps: displaying an image by the display panel; providing an airflow to a front of the television and sensing a motion of a user to generate at least one sensing signal to the processor by the motion sensing fan module; and controlling an air volume of the airflow provided by the motion sensing fan module based on the at least one sensing signal by the processor.

In some embodiments, the step of providing the airflow to the front of the television and sensing the motion of the user to generate the at least one sensing signal to the processor by the motion sensing fan module includes the following steps: respectively sensing the motion of the user by a plurality of sensors of the motion sensing fan module, and correspondingly outputting a sensing signal to the processor when one of the plurality of sensors senses the motion of the user; correspondingly generating, by the processor, a rotational speed control signal based on a number of the sensing signal(s) obtained by the processor; and determining a rotational speed of a fan of the motion sensing fan module based on the rotational speed control signal by a driving circuit of the motion sensing fan module.

In some embodiments, the control method further includes the following steps: outputting a laser beam control signal by the processor; and projecting a plurality of laser beams to display a motion area based on the laser beam control signal by a laser device of the motion sensing fan module.

In some embodiments, the control method further includes the following steps: sensing the motion of the user by at least one environment sensor to output at least one environment sensing signal to the processor; and correspondingly generating the rotational speed control signal to the driving circuit based on the at least one environment sensing signal by the processor, and making the driving circuit control the rotational speed of the fan based on the rotational speed control signal.

Therefore, based on the technical content of the present disclosure, the television, the motion sensing fan assembly, the control method, and the computer readable medium of the present disclosure can simulate outdoor cycling, running, etc. when it rains, so that users can still team up with others to enjoy the fun of outdoor cycling, running, etc. when it rains. Besides, the television, the motion sensing fan assembly, the control method, and the computer readable medium of the present disclosure can provide the corresponding airflow according to the user's state of riding indoor stationary bike, running, etc., so that the user further can experience the feeling of being on the scene.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

Figure 1:
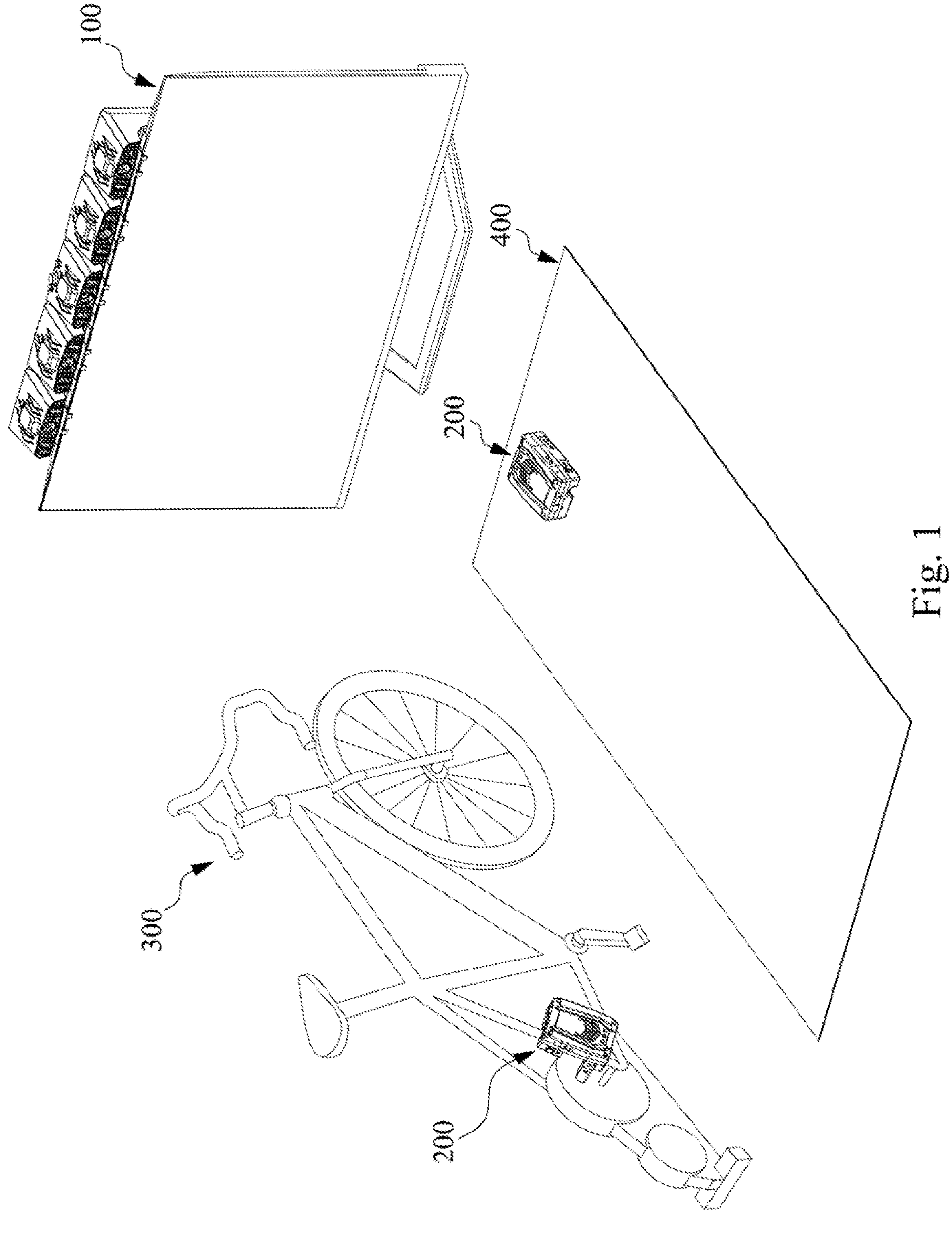
FIG. 1 depicts a schematic diagram of a television, an environment sensing device, an indoor stationary bike, and a running mat according to one embodiment of the present disclosure.

According to the usual mode of operation, various features and elements in the figures have not been drawn to scale, which are drawn to the best way to present specific features and elements related to the disclosure. In addition, among the different figures, the same or similar element symbols refer to similar elements/components.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

Various embodiments of the present technology are discussed in detail below with figures. It should be understood that the details should not limit the present disclosure. In other words, in some embodiments of the present disclosure, the details are not necessary. In addition, for simplification of figures, some known and commonly used structures and elements are illustrated simply in figures.

In the present disclosure, "connected" or "coupled" may refer to "electrically connected" or "electrically coupled." "Connected" or "coupled" may also refer to operations or actions between two or more elements.

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

FIG. 1 depicts a schematic diagram of a television 100, an environment sensing device 200, an indoor stationary bike 300, and a running mat 400 according to one embodiment of the present disclosure. However, the present disclosure is not limited to the embodiment shown in FIG. 1. In some embodiments, the indoor stationary bike 300 also can be a flywheel, and the running mat 400 can also be used as a treadmill, depending on actual needs. As shown in the figure, the environment sensing device 200 can be placed on the indoor stationary bike 300 and the running mat 400 respectively, and the indoor stationary bike 300 and the running mat 400 can interact with the television 100 through the environment sensing device 200 in a wired manner or a wireless manner.

Figure 2:
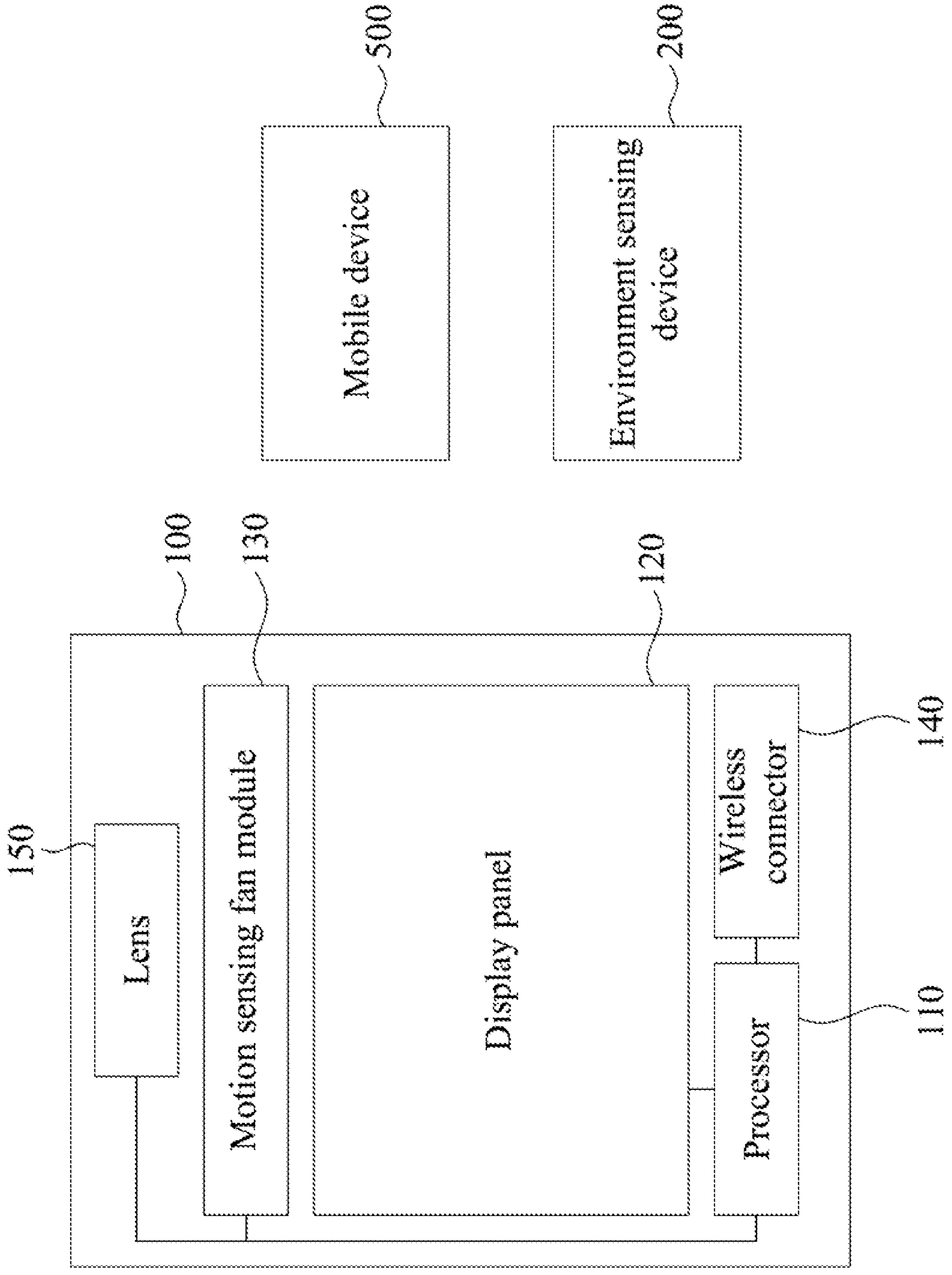
FIG. 2 depicts a schematic diagram of a television, an environment sensing device, and a mobile device according to one embodiment of the present disclosure.

In order to make operations between the television 100 and the environment sensing device 200 of the present disclosure easy to understand, please refer to FIG. 2 together. FIG. 2 depicts a schematic diagram of a television 100, an environment sensing device 200, and a mobile device 500 according to one embodiment of the present disclosure. As shown in the figure, the television 100 includes a processor 110, a display panel 120, a motion sensing fan module 130, and a wireless connector 140. The processor 110 is coupled to the display panel 120, the motion sensing fan module 130, and the wireless connector 140.

In operation, the processor 110 wirelessly receives an audio-visual signal provided by the mobile device 500 through the wireless connector 140, and provides the audio-visual signal to the display panel 120. However, the present disclosure is not limited to the embodiment, and in some embodiments, the processor 110 may also receive the audio-visual signal provided by the mobile device 500 through a wired manner, depending on specific needs. The display panel 120 receives the audio-visual signal to display an image. The motion sensing fan module 130 is configured to provide an airflow to a front of the television 100, for example towards the front of provide airflow of the television 100, and senses a motion of a user to generate at least one sensing signal to the processor 110. The processor 110 is configured to control an air volume of the airflow provided by the motion sensing fan module 130 based on the at least one sensing signal. In one embodiment, the processor 110 can be but not limited to a single processor or an integrated device of a plurality of microprocessors, such as a central processor (CPU), a graphics processing unit (GPU), or an application-specific integrated circuit (ASIC) . . . etc.

For example, the mobile device 500 can be but not limited to a mobile phone, a tablet, a laptop, and other portable device. Taking the mobile phone 500 as an example, the user can cast a screen of the mobile phone to the television 100 through the mobile phone 500. In detail, the mobile phone 500 transmits the audio-visual signal to the wireless connector 140 of the television 100, but the present disclosure is not limited to the embodiment. In some embodiments, the mobile phone 500 can also transmit the audio-visual signal to the television 100 through a wired manner, depending on actual needs. In one embodiment, the mobile phone 500 can transmit the above audio-visual signal to the wireless connector 140 of the television 100 through not limited to an application (APP) built in the mobile phone 500. For example, the above wireless connector 140 can be but not limited to a Bluetooth module, a WiFi module, a mobile communication module, or an infrared module, etc.

Subsequently, the processor 110 receives the audio-visual signal from the wireless connector 140, and then transmits the audio-visual signal to the display panel 120 to display the image. However, the present disclosure is not limited to the embodiment, In some embodiments, the processor 110 can also receive the audio-visual signal through a wired manner, such as a universal serial bus, a coaxial cable, a Lighting transmission line, or other form of signal transmission line, depending on actual needs. In one embodiment, the display panel 120 can be but not limited to a two dimensional (2D) display panel or a three dimensional (3D) display panel. If the display panel 120 is the three dimensional display panel, depending on the type of the three dimensional display panel 120, the user can view a three dimensional image through a three dimensional glasses or with naked eyes. Besides, the motion sensing fan module 130 can be used to sense the motion of the user, such as sensing an user's waving, running . . . etc., and generate the at least one sensing signal to the processor 110.

The processor 110 is configured to control the air volume of the airflow provided by the motion sensing fan module 130 based on the at least one sensing signal. For example, the motion sensing fan module 130 can generate the at least one sensing signal based on an amount of the motion of the user, then the processor 110 controls the motion sensing fan module 130 based on the at least one sensing signal to generate different air volume of the airflow accordingly. To sum up, if a movement of the user is large, the motion sensing fan module 130 can generate a relatively strong airflow. Conversely, if the movement of the user is small, the motion sensing fan module 130 can generate a relatively weak airflow, and so on.

It should be noted that, in one embodiment, the motion sensing fan module 130 can be directly configured in the television 100 instead of outside the television 100. In other words, the motion sensing fan module 130 can form an all-in-one device with the television 100.

In one embodiment, the environment sensing device 200 can have a wireless connector, which can wireless couple to the processor 110 through the wireless connector 140 of the television 100. However, the present disclosure is not limited to this embodiment. In some embodiments, the environment sensing device 200 can also be coupled to the processor 110 through the wired manner, depending on actual needs. The environment sensing device 200 senses the motion of the user and outputs the at least one environment sensing signal to the processor 110. The processor 110 generates corresponding speed control signals, so as to control the strength of the airflow, i.e. an air volume of the airflow, provided by the motion sensing fan module 130.

For example, please refer to FIG. 1 and FIG. 2, the environment sensing device 200 sense an amount of exercise generated by the user riding the indoor stationary bike 300 or running on the running mat 400 and output the at least one environment sensing signal, and wirelessly transmit the at least one environment sensing signal to the processor 110 through but not limited to the Bluetooth. Then, the processor 110 generates the corresponding rotational speed control signal according to the at least one environment sensing signal, and controls the air volume of the airflow provided by the motion sensing fan module 130.

In one embodiment, the television 100 further includes a lens 150, and the lens 150 is coupled to the processor 110. The lens 150 capture an image and generates an image signal to the processor 110, and then the processor 110 transmits the image signal to the internet through the wireless connector 140, but the present disclosure is not limited to the embodiment, In some embodiments, the processor 110 can also transmit the image signal to the internet through the wired manner, depending on actual needs. For example, the television 100 has a built in lens 150, so that the user can use a video software to team up with other indoors to enjoy a fun of cycling, running . . . etc. The above video software can be but not limited to Zoom, Google meet, Google Classroom . . . and other video software.

In this way, the television 100 of the present disclosure can simulate outdoor sports such as cycling, running, etc. when it's raining. For example, the user can still team up with other indoors to enjoy the fun of forgoing mentioned outdoor sports despite the bed weather. Besides, the television 100 of the present disclosure can provide the appropriate airflow according to the user's cycling, running, etc., and provide the user with the feeling of the breeze when cycling, running, etc. outdoors, thus providing a more immersive experience for the user.

It should be noted that circuits and operations depicted in FIGS. 1 and 2 are provided for illustrative purposes only and do not limit the scope of the present disclosure. The patent scope of the present disclosure shall be determined by the claims in the patent application. Modifications and refinements made to the embodiments of the present disclosure by those skilled in the art, without departing from the spirit of the present disclosure, also fall within the scope of the present disclosure patent application.

Figure 3A:
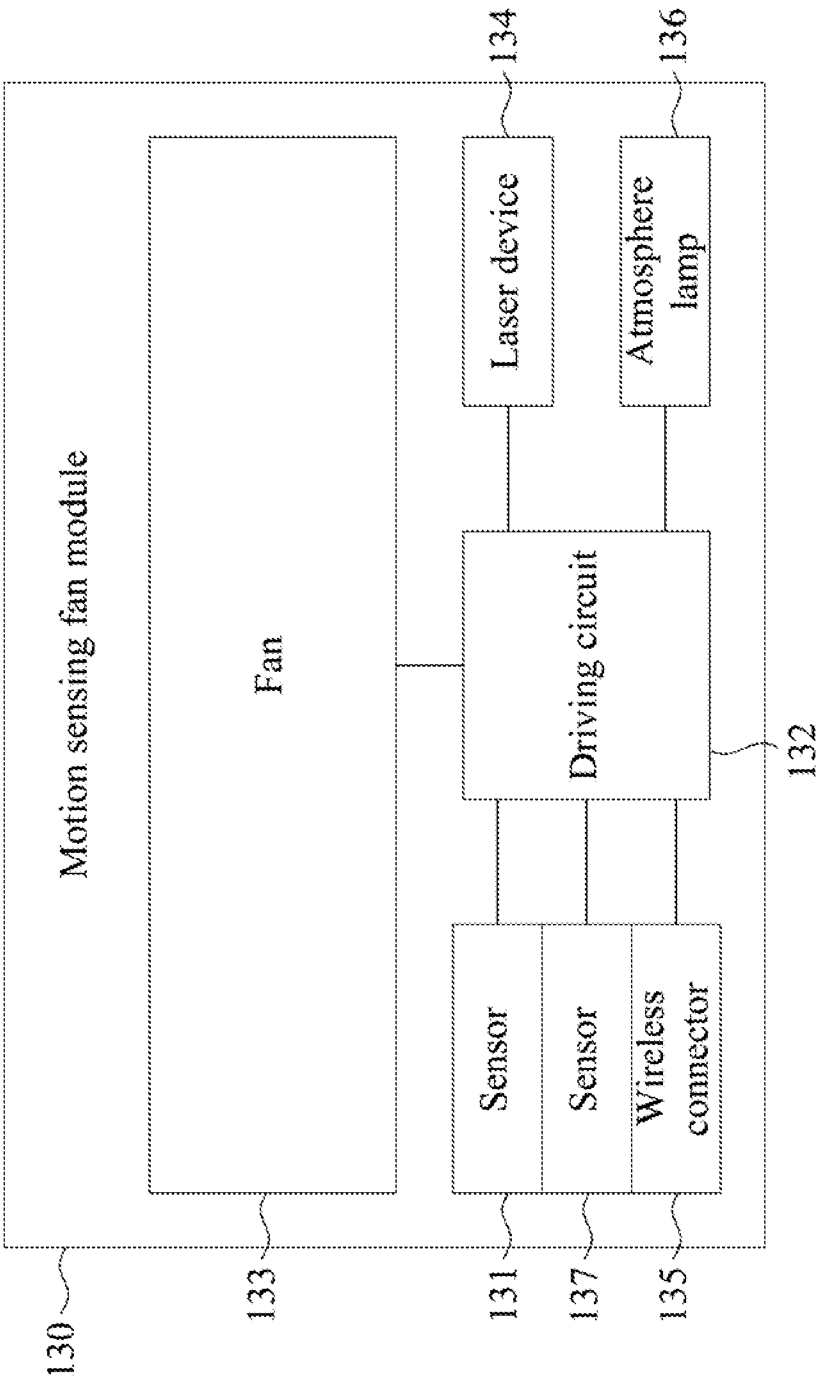
FIG. 3A depicts a schematic diagram of a motion sensing fan module of the television shown in FIG. 2 according to one embodiment of the present disclosure.

FIG. 3A depicts a schematic diagram of a motion sensing fan module 130 of the television 100 shown in FIG. 2 according to one embodiment of the present disclosure. As shown in the figure, the motion sensing fan module 130 includes a plurality of sensor 131, 137, a driving circuit 132, and a fan 133. The plurality of sensor 131, 137 are coupled to the processor 110 in FIG. 2, and the plurality of sensor 131, 137 respectively sense the motion of the user, for example, the plurality of sensors 131, 137 can sense the motion of the user waving, running . . . etc. When one of the plurality of sensors 131, 137 senses the motion of the user, a sensing signal is correspondingly outputted to the processor 110, and the processor 110 correspondingly generates a rotational speed control signal based on a number of the sensing signal(s) obtained by the processor. The driving circuit 132 is coupled to the processor 110 of FIG. 2, and the driving circuit 132 receives the rotational speed control signal. The fan 133 is coupled to the driving circuit 132, and the fan 133 is driven by the driving circuit 132 to generate the airflow based on the rotational speed control signal. In one embodiment, a plurality of sensor 131, 137 can be but not limited to an infrared sensor (such as an IR sensor).

In one embodiment, the processor 110 of FIG. 2 further outputs a laser beam control signal, and the motion sensing fan module 130 of FIG. 3A further includes a laser device 134. The laser device 134 is coupled to the processor 110, and the laser device 134 is configured to project a plurality of laser beams to display a motion area based on the laser beam control signal, so as to divide the area where the user performs related motion. In one embodiment, laser device 134 can be, but not limited to, a laser module.

In another embodiment, the motion sensing fan module 130 further includes a wireless connector 135, and the wireless connector 135 is used for wireless connection with other devices, for example, the wireless connector 135 is used for wireless connection with the mobile device 500 of FIG. 2, or with the environment sensing device 200 of FIG. 2, but the present disclosure is not limited to the embodiment. For example, wireless connector 135 can be but not limited to the Bluetooth module.

In one embodiment, the processor 110 of FIG. 2 further outputs a light control signal, the motion sensing fan module 130 of FIG. 3A further includes an atmosphere lamp 136. The atmosphere lamp 136 is coupled to the processor 110, and the atmosphere lamp 136 emits an atmosphere light based on the light control signal. For example, the atmosphere lamp 136 can emit different colors of the atmosphere light according to the light control signal, and the atmosphere lamp 136 can be but not limited to a light emitting diode (LED).

Figure 3B:
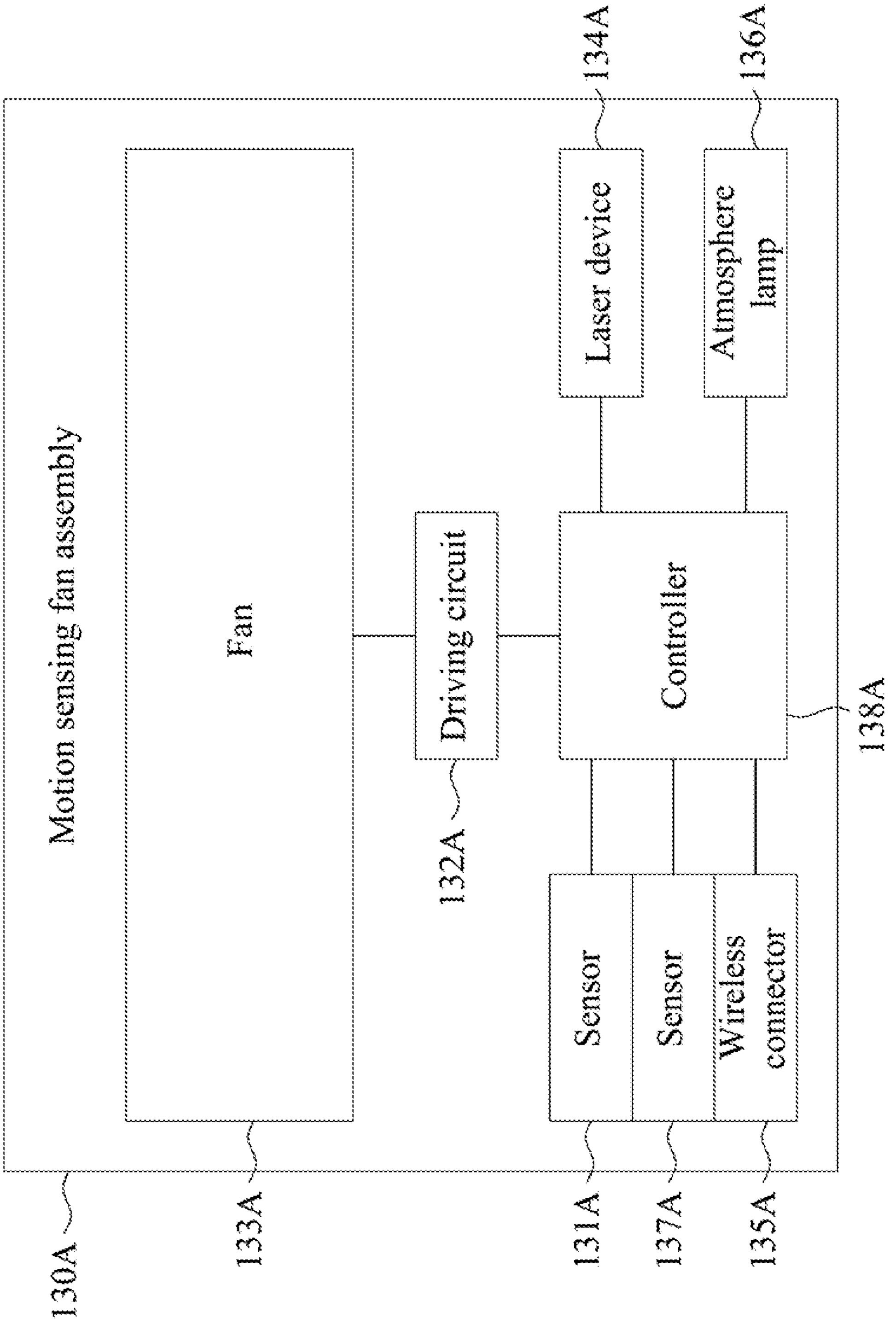
FIG. 3B depicts a schematic diagram of a motion sensing fan assembly according to one embodiment of the present disclosure.

FIG. 3B depicts a schematic diagram of a motion sensing fan assembly 130A according to one embodiment of the present disclosure. Compared with the motion sensing fan module 130 in FIG. 3A built in the television 100, the motion sensing fan assembly 130A in FIG. 3B can be independent of the television 100. Therefore, the motion sensing fan assembly 130A in FIG. 3B further includes a controller 138A, to control motion sensing fan assembly 130A independently.

As shown in FIG. 3B, the motion sensing fan assembly 130A includes a plurality of sensor 131A, 137A, a controller 138A, the driving circuit 132A, and the fan 133A. The controller 138A is coupled to sensor 131A, 137A, and the driving circuit 132A, and the driving circuit 132A is coupled to the fan 133A.

The plurality of sensors 131A, 137A can sense the motion of the user waving, running, etc. When one of the plurality of sensors 131A, 137A senses the motion of the user, a sensing signal is correspondingly outputted. The controller 138A correspondingly outputs a rotational speed control signal based on a number of the sensing signal(s) obtained by the controller. The driving circuit 132A receives the rotational speed control signal. The fan 133A is driven by the driving circuit 132A to rotate and provide the airflow. The driving circuit 132A determines the air volume of the airflow provided by the fan 133A based on the rotational speed control signal. In one embodiment, the plurality of sensor 131A, 137A can be but not limited to the infrared sensor (such as the IR sensor).

In one embodiment, the controller 138A outputs the laser beam control signal, the motion sensing fan assembly 130A further includes the laser device 134A. The laser device 134A is coupled to the controller 138A, and the laser device 134A projects the plurality of laser lights to display the motion area according to the laser beam control signal, so as to divide the area where the user performs related motion. In one embodiment, the laser device 134A can be but not limited to the infrared sensor (such as the IR sensor).

In another embodiment, the motion sensing fan assembly 130A further includes the wireless connector 135A, which is used for wireless connection with other devices. For example, the wireless connector 135A of the motion sensing fan assembly 130A can be wirelessly connected with the television 100, the environment sensing device 200, and the mobile device 500. However, the present disclosure is not limited to the embodiment. In one embodiment, the wireless connector 135A can be, but not limited to, the Bluetooth module.

In one embodiment, the controller 138A outputs the light control signal, the motion sensing fan assembly 130A further includes the atmosphere lamp 136A. The atmosphere lamp 136A is coupled to the controller 138A, and the atmosphere lamp 136A emits the atmosphere light based on the light control signal. For example, the atmosphere lamp 136A can emit different colors of the atmosphere light based on the light control signal, and the atmosphere lamp 136A can be but not limited to the light emitting diode (LED).

It should be noted that the circuits and operations depicted in FIGS. 3A and 3B are provided for illustrative purposes only and do not limit the scope of the present disclosure. The patent scope of the present disclosure shall be determined by the claims in the patent application. Modifications and refinements made to the embodiments of the present disclosure by those skilled in the art, without departing from the spirit of the present disclosure, also fall within the scope of the present disclosure patent application.

Figure 4:
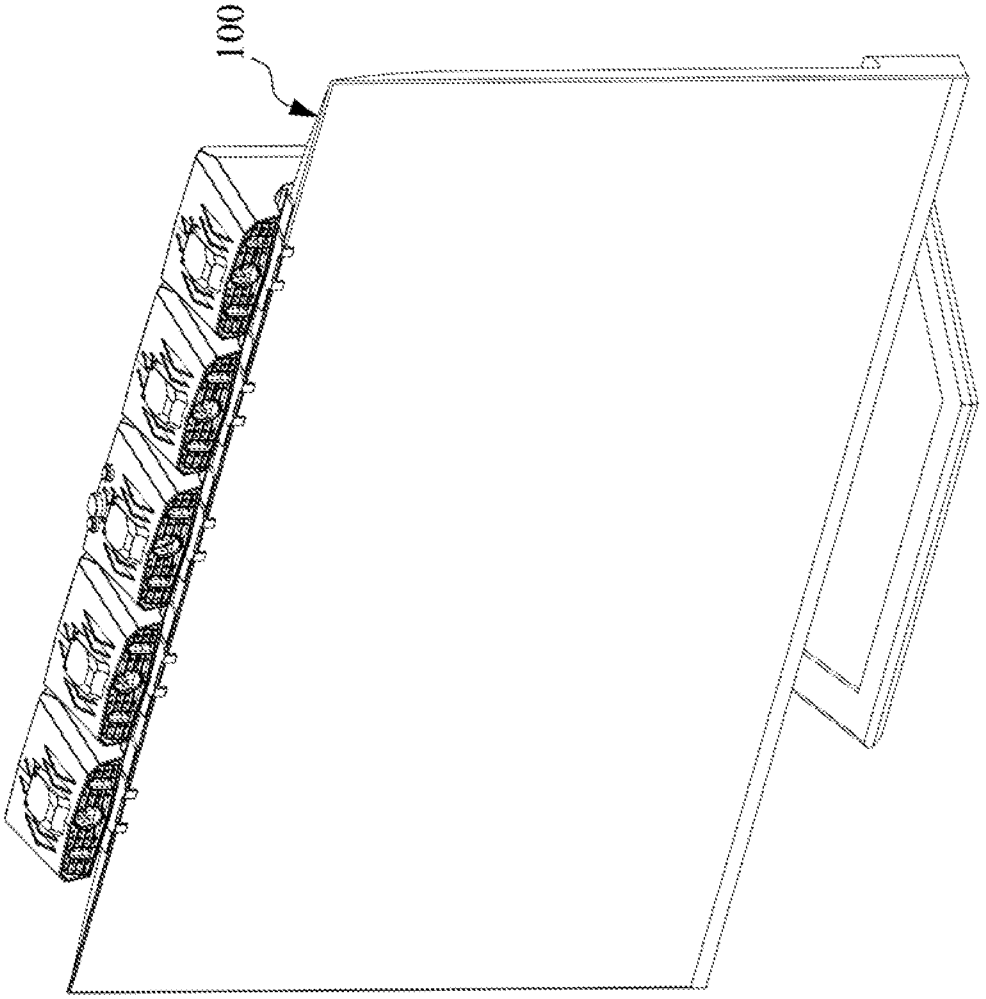
FIG. 4 depicts a schematic diagram of a front view of a television according to one embodiment of the present disclosure.
Figure 5:
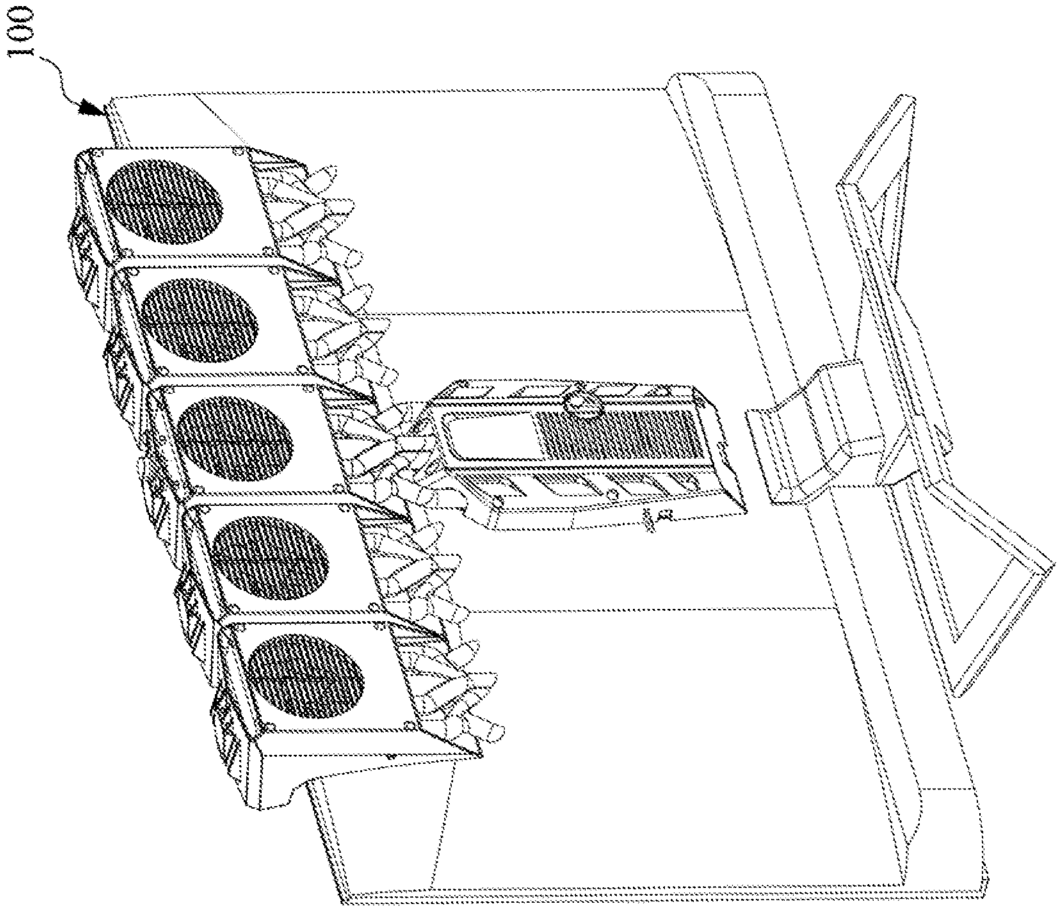
FIG. 5 depicts a schematic diagram of a rear view of a television according to one embodiment of the present disclosure.

FIG. 4 depicts a schematic diagram of a front view of a television 100 according to one embodiment of the present disclosure. FIG. 5 depicts a schematic diagram of a rear view of a television 100 according to one embodiment of the present disclosure. As shown in FIG. 4 and FIG. 5, both the front and rear of the television 100 are shown in the figure to fully present an appearance of the television 100. It should be noted that in this embodiment, the television 100 is equipped with a plurality of fan modules, but the present disclosure is not limited to the embodiment.

Figure 6:
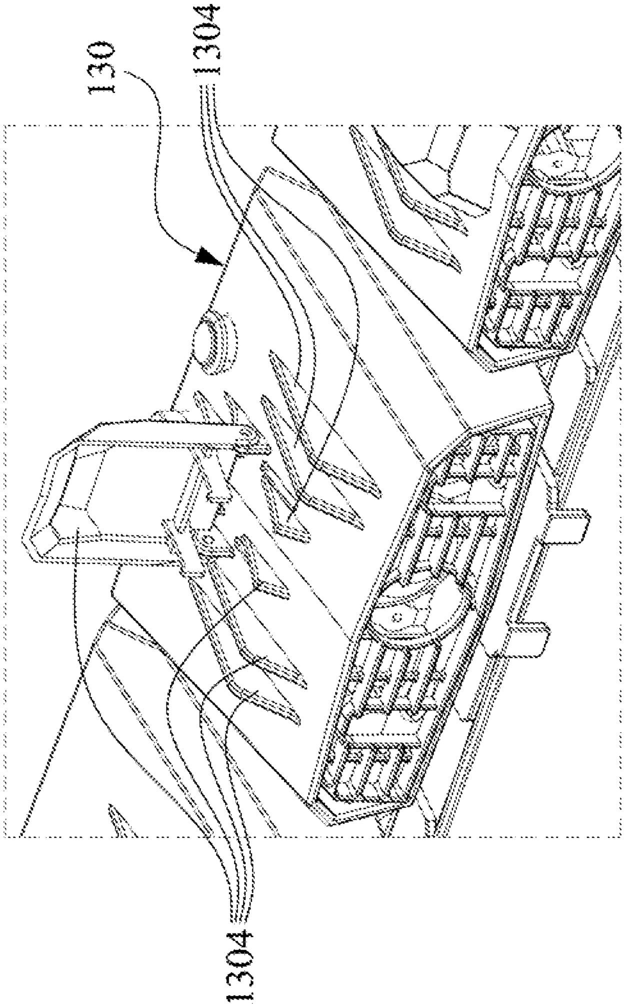
FIG. 6 depicts a schematic diagram of a motion sensing fan module of the television shown in FIG. 2 according to one embodiment of the present disclosure.

FIG. 6 depicts a schematic diagram of a motion sensing fan module 130 of the television 100 shown in FIG. 2 according to one embodiment of the present disclosure. As shown in the figure, the motion sensing fan module 130 further includes a bracket 1304. The bracket 1304 can be used to mount the mobile device 500.

Figure 7:
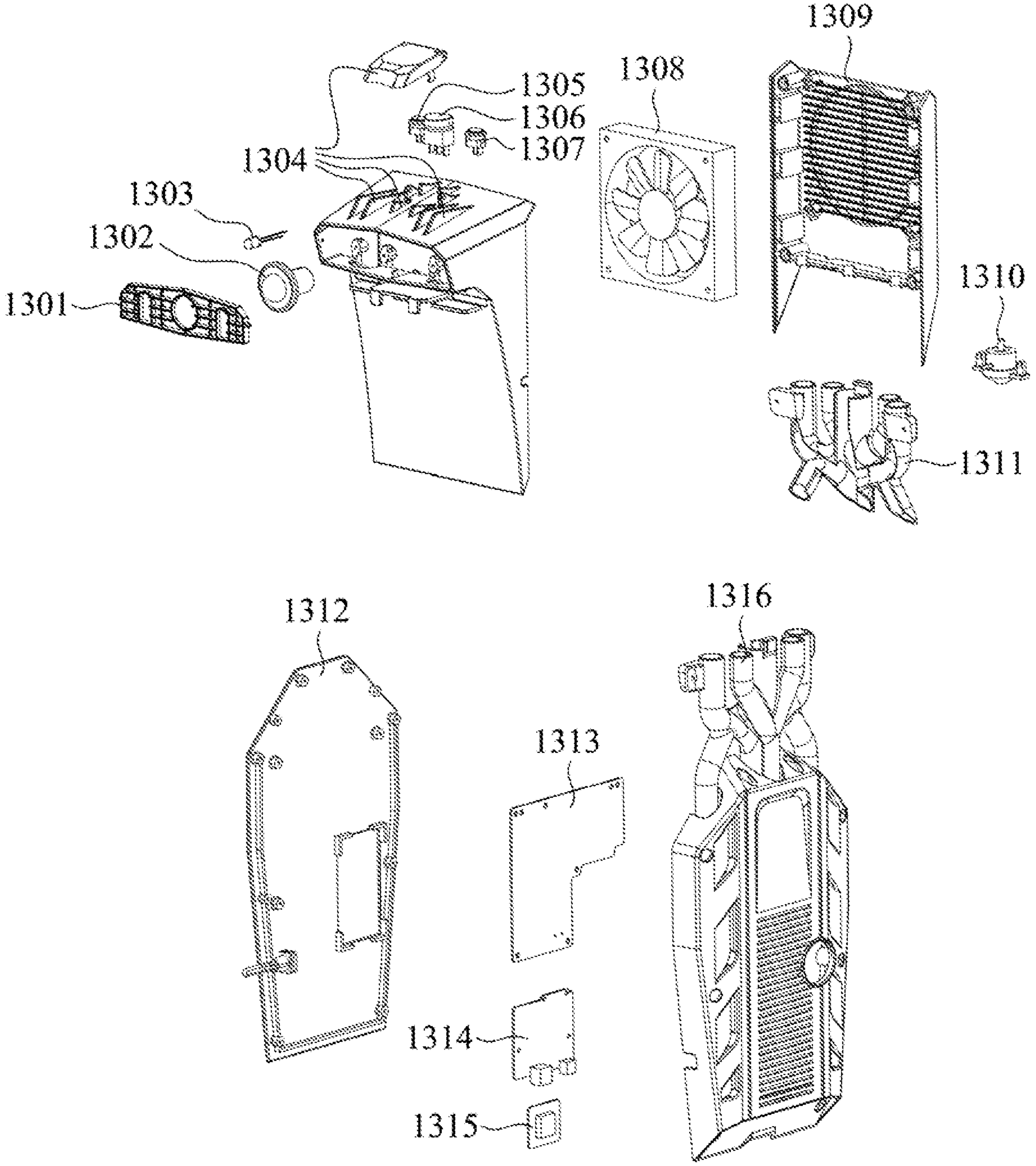
FIG. 7 depicts a schematic diagram of an exploded view of a motion sensing fan module of the television shown in FIG. 2 according to one embodiment of the present disclosure.

FIG. 7 shows a schematic diagram of an exploded view of a motion sensing fan module 130 of the television 100 shown in FIG. 2 according to one embodiment of the present disclosure, in order to facilitate understanding of the module's structure. As shown in the figure, the motion sensing fan module 130 includes a fan protection net 1301, a sensor 1302, an atmosphere lamp 1303, the bracket 1304, an atmosphere lamp switch 1305, a master switch 1306, a laser device switch 1307, the fan 1308, a rear case 1309, the laser device 1310, an air intake duct 1311, a main control box lower cover 1312, a power board 1313, the driving circuit 1314, the wireless connector 1315, and a main control box cover 1316. It should be noted that, in order to make an internal structure of the motion sensing fan module 130 easy to understand, the components of the internal structure are numbered according to the order of the components in FIG. 7 for easy reading.

Besides, a comparative relationship between the components in FIG. 3A and the components in FIG. 7 is described below, the sensors 131 and 137 in FIG. 3A correspond to the sensor 1302 in FIG. 7, and the driving circuit 132 in FIG. 3A corresponds to the driving circuit 1314 in FIG. 7. The fan 133 in FIG. 3A corresponds to the fan 1308 in FIG. 7, and the laser device 134 in FIG. 3A corresponds to the laser device 1310 in FIG. 7. The wireless connector 135 in FIG. 3A corresponds to the wireless connector 1315 in FIG. 7, and the atmosphere lamp 136 in FIG. 3A corresponds to the atmosphere lamp 1303 in FIG. 7.

It should be understood that, the structures shown in FIGS. 4 to 7 are not intended to limit the scope of the present invention. They are merely used as illustrative examples of one of the implementation methods of the present disclosure to facilitate its understanding. The scope of patent protection for the present disclosure shall be determined by the patent claims in the present disclosure application. Modifications and refinements made to the embodiments of the present invention by those skilled in the art, as long as they do not depart from the spirit of the present invention, still fall within the scope of the patent application of the present invention.

Figure 8:
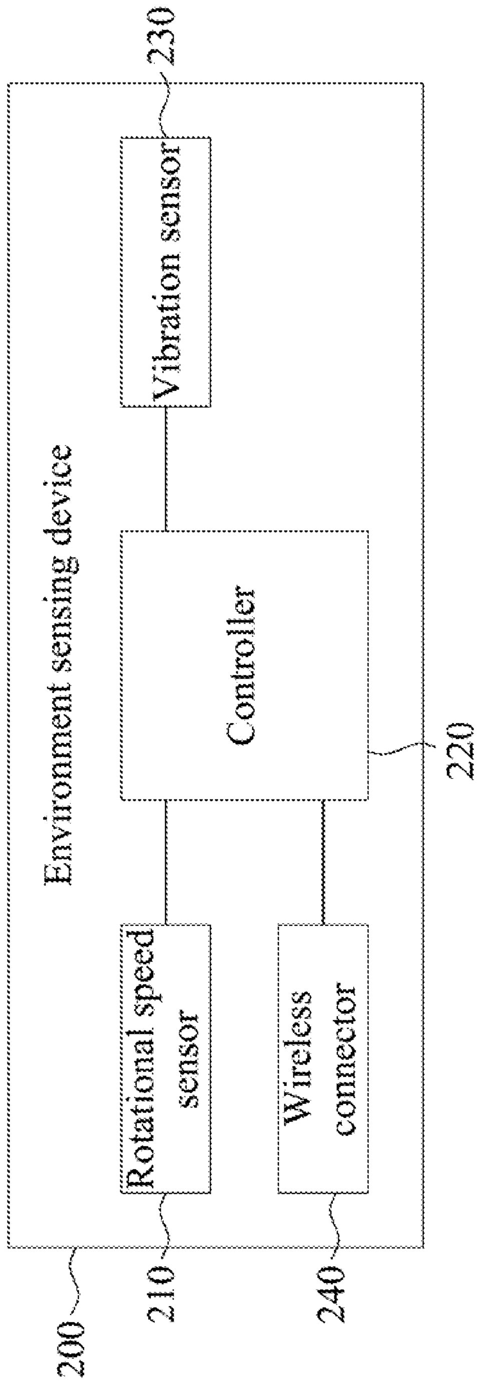
FIG. 8 depicts a circuit block diagram of an environment sensing device of the television shown in FIG. 1 of FIG. 2 according to one embodiment of the present disclosure.

FIG. 8 depicts a circuit block diagram of an environment sensing device 200 of the television shown in FIG. 1 of FIG. 2 according to one embodiment of the present disclosure. As shown in the figure, the environment sensing device 200 includes at least one environment sensor (such as a rotational speed sensor 210 or a vibration sensor 230) and the controller 220. The at least one environment sensor is wired or wirelessly coupled to the processor 110 in FIG. 2. In operation, the at least one environment sensor senses the motion of the user and outputs the at least one environment sensing signal to the processor 110. The processor 110 correspondingly generates the rotational speed control signal to the driving circuit 132 in FIG. 3A based on the at least one environment sensing signal, and makes the driving circuit 132 control the rotational speed of the fan 133 based on the rotational speed control signal.

For example, the at least one environment sensor can be, but not limited to, at least one of the rotational speed sensor 210 and the vibration sensor 230. For example, the rotational speed sensor 210 can be, but not limited to, a Hall sensor. The rotational speed sensor 210 is used to sense a rotational speed. For example, the rotational speed sensor 210 is arranged near the rear wheel of the indoor stationary bike 300 in FIG. 1, and a magnetic material arranged on the rear wheel senses the rotation speed of the rear wheel to output the at least one environment sensing signal to the processor 110 in FIG. 2. The processor 110 correspondingly generates the rotational speed control signal to the driving circuit 132 in FIG. 3A based on the at least one environment sensing signal, and makes the driving circuit 132 control the rotational speed of the fan 133 based on the rotational speed control signal. In one embodiment, controller 220 can be but not limited to the single processor or the integrated device of the plurality of microprocessors, such as the central processor (CPU), the graphics processing unit (GPU), or the application-specific integrated circuit (ASIC) . . . etc.

On the other hand, the at least one environment sensor can be but not limit to the vibration sensor 230, which is configured to sense an amount of a vibration. For example, the vibration sensor 230 is arranged on the running mat 400 in FIG. 1 to sense the amount of the vibration generated by the user while running and output the at least one environment sensing signal to the processor 110 in FIG. 2. The processor 110 correspondingly generates the rotational speed control signal to the driving circuit 132 in FIG. 3A based on the at least one environment sensing signal, and makes the driving circuit 132 control the rotational speed of the fan 133 based on the rotational speed control signal.

In one embodiment, the environment sensing device 200 further includes the wireless connector 240, and the wireless connector 240 is used for wireless connection with other devices. For example, the wireless connector 240 is used for wireless connection with the wireless connector 140 of television 100 in FIG. 2, or with the mobile device 500 in FIG. 2, but the present disclosure is not limited to the embodiment. For example, the wireless connector 240 can be but not limit to the Bluetooth module.

It should be noted that the circuit and operation shown in FIG. 8 are for illustrative purposes only and do not limit the scope of the present disclosure. The embodiments of the present disclosure may be modified and improved upon by those skilled in the art without departing from the spirit of the present disclosure. The patent scope of the present disclosure shall be determined by the claims of the present disclosure application.

Figure 9:
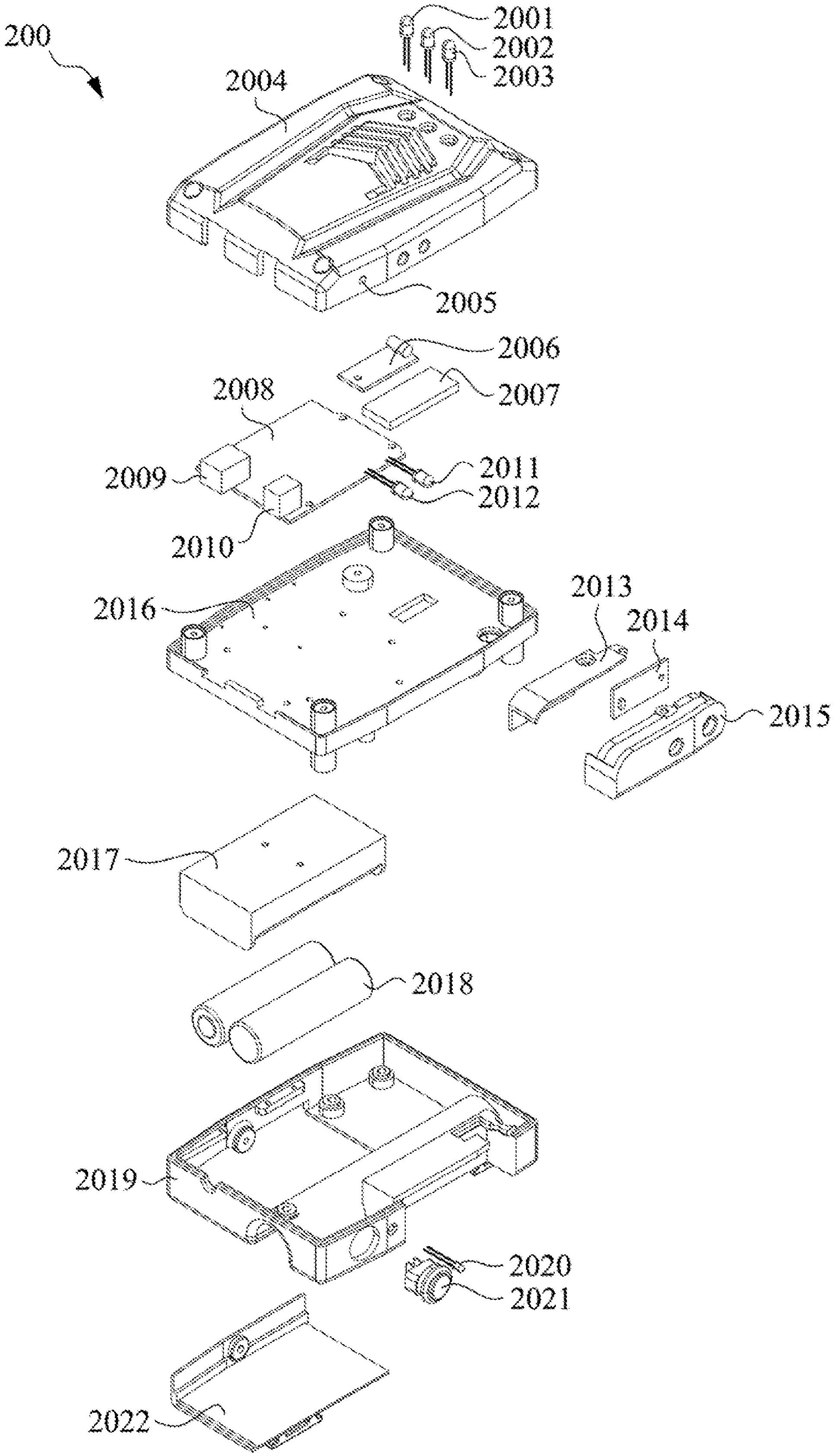
FIG. 9 depicts a schematic diagram of an exploded view of an environment sensing device of the television shown in FIG. 1 of FIG. 2 according to one embodiment of the present disclosure.

FIG. 9 depicts a schematic diagram of an exploded view of an environment sensing device 200 of the television shown in FIG. 1 of FIG. 2 according to one embodiment of the present disclosure to facilitate a better understanding of its structure. As shown in the figure, the environment sensing device 200 includes a vibration sensing signal light 2001, a Bluetooth transmit signal light 2002, a speed sensing signal light 2003, a cover 2004, a mode switch button 2005, the vibration sensor 2006, the wireless connector 2007, the controller 2008, a soft update jack 2009, a power jack 2010, a running mode indicator light 2011, a cycling mode indicator light 2012, a rotational induction seat cover 2013, the rotational speed sensor 2014, a rotational induction seat cover 2015, a middle shell 2016, a buttery holder 2017, a buttery 2018, a lower cover 2019, a power light 2020, a power switch 2021, and a buttery cover 2022. In order to make an internal structure of the environment sensing device 200 easy to understand, the components of the internal structure are numbered according to the order of the components in FIG. 9 for ease of reading.

Besides, a comparative relationship between the components in FIG. 8 and the components in FIG. 9 is described as below. The rotational speed sensor 210 in FIG. 8 corresponds to the rotational speed sensor 2014 in FIG. 9, the controller 220 in FIG. 8 corresponds to the controller 2008 in FIG. 9, the vibration sensor 230 in FIG. 8 corresponds to the vibration sensor 2006 in FIG. 9, and the wireless connector 240 in FIG. 8 corresponds to the wireless connector 2007 in FIG. 9.

Figure 10:
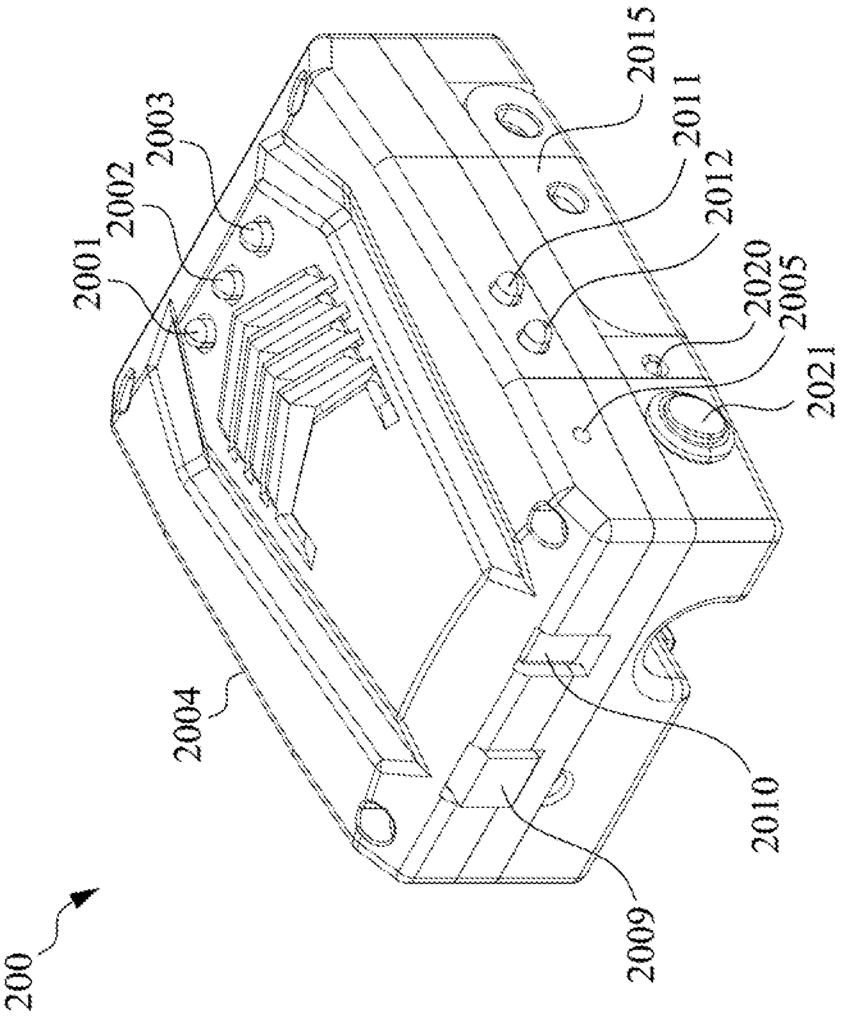
FIG. 10 depicts a schematic diagram of a front view of an environment sensing device of the television shown in FIG. 1 of FIG. 2 according to one embodiment of the present disclosure.
Figure 11:
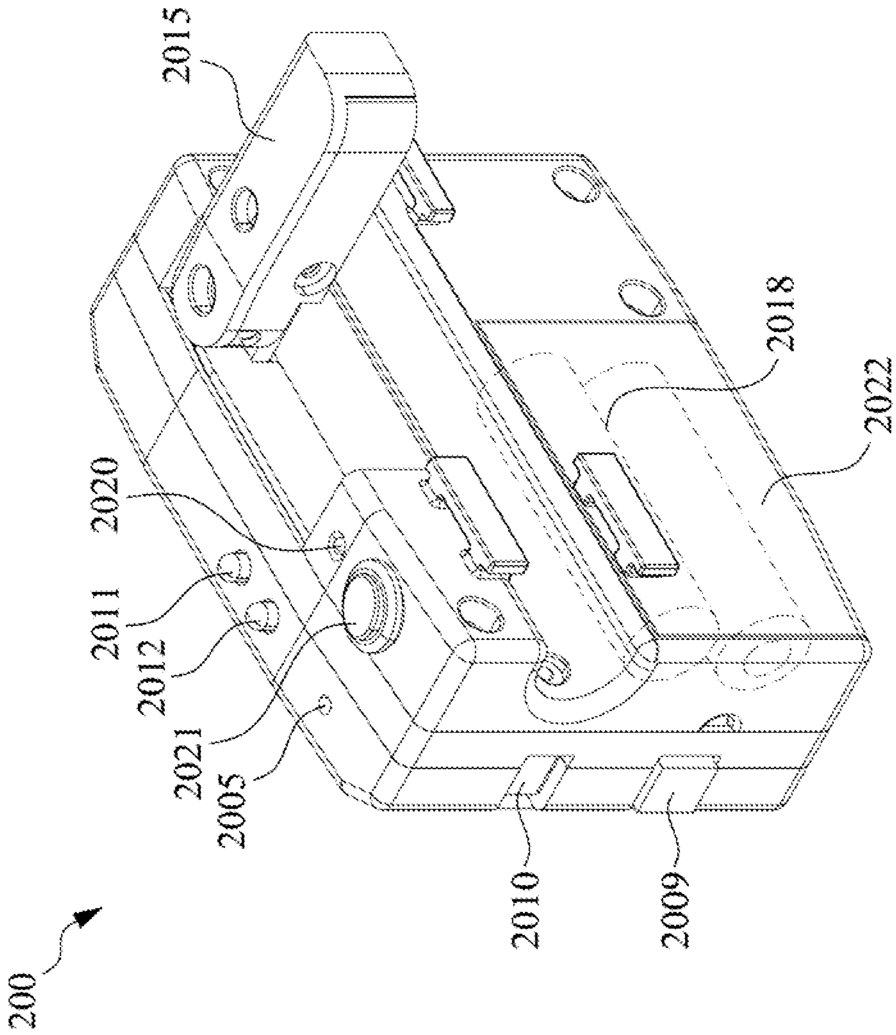
FIG. 11 depicts a schematic diagram of a lateral view of an environment sensing device of the television shown in FIG. 1 of FIG. 2 according to one embodiment of the present disclosure.

FIG. 10 depicts a schematic diagram of a front view of an environment sensing device 200 of the television shown in FIG. 1 of FIG. 2 according to one embodiment of the present disclosure. FIG. 11 depicts a schematic diagram of a lateral view of an environment sensing device 200 of the television shown in FIG. 1 of FIG. 2 according to one embodiment of the present disclosure. As shown in FIG. 10 and FIG. 11, the front view and the lateral view of the environment sensing device 200 are shown in the figure to fully present an appearance of the environment sensing device 200.

Figure 12:
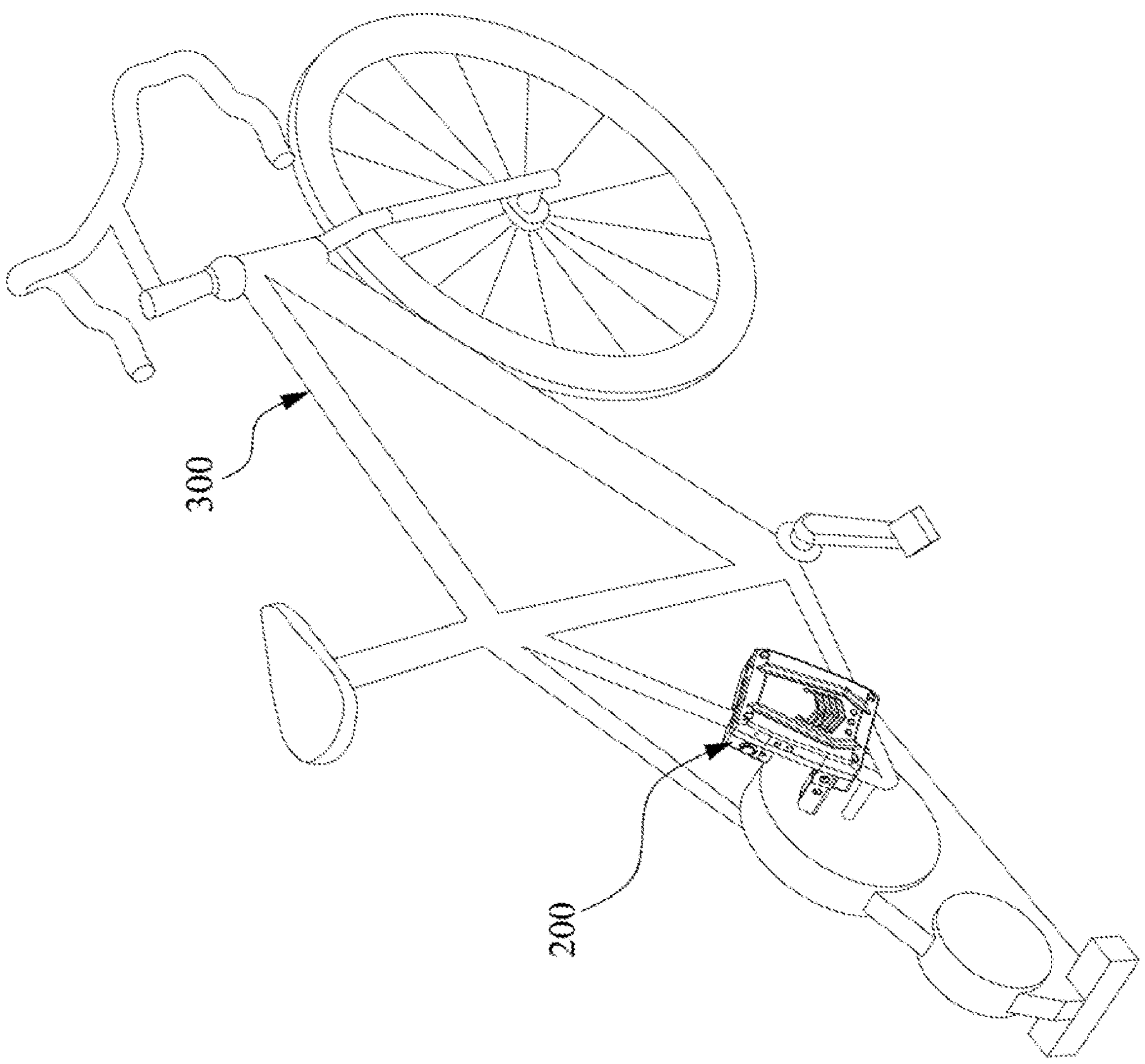
FIG. 12 depicts a schematic diagram of an indoor stationary bike and an environment sensing device shown in FIG. 1 according to one embodiment of the present disclosure.

FIG. 12 depicts a schematic diagram of an indoor stationary bike 300 and an environment sensing device 200 shown in FIG. 1 according to one embodiment of the present disclosure. As shown in the figure, the environment sensing device 200 can be arranged near a rear wheel of the indoor stationary bike 300 to sense a rotation speed of the rear wheel.

Figure 13:
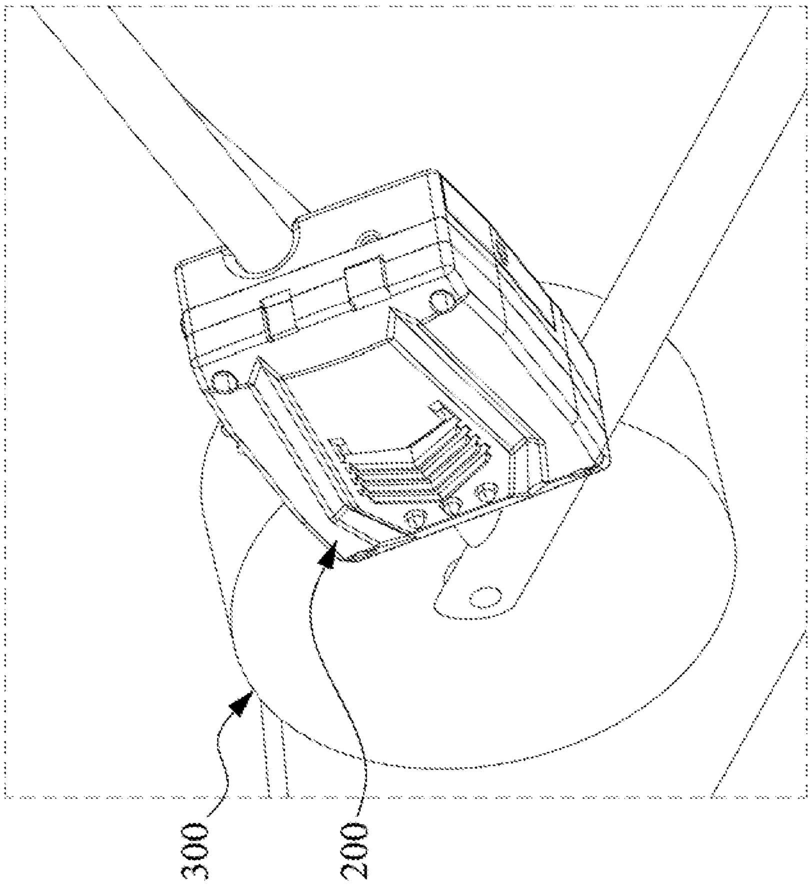
FIG. 13 depicts a schematic diagram of a portion of an indoor stationary bike and an environment sensing device shown in FIG. 1 according to one embodiment of the present disclosure.
Figure 14:
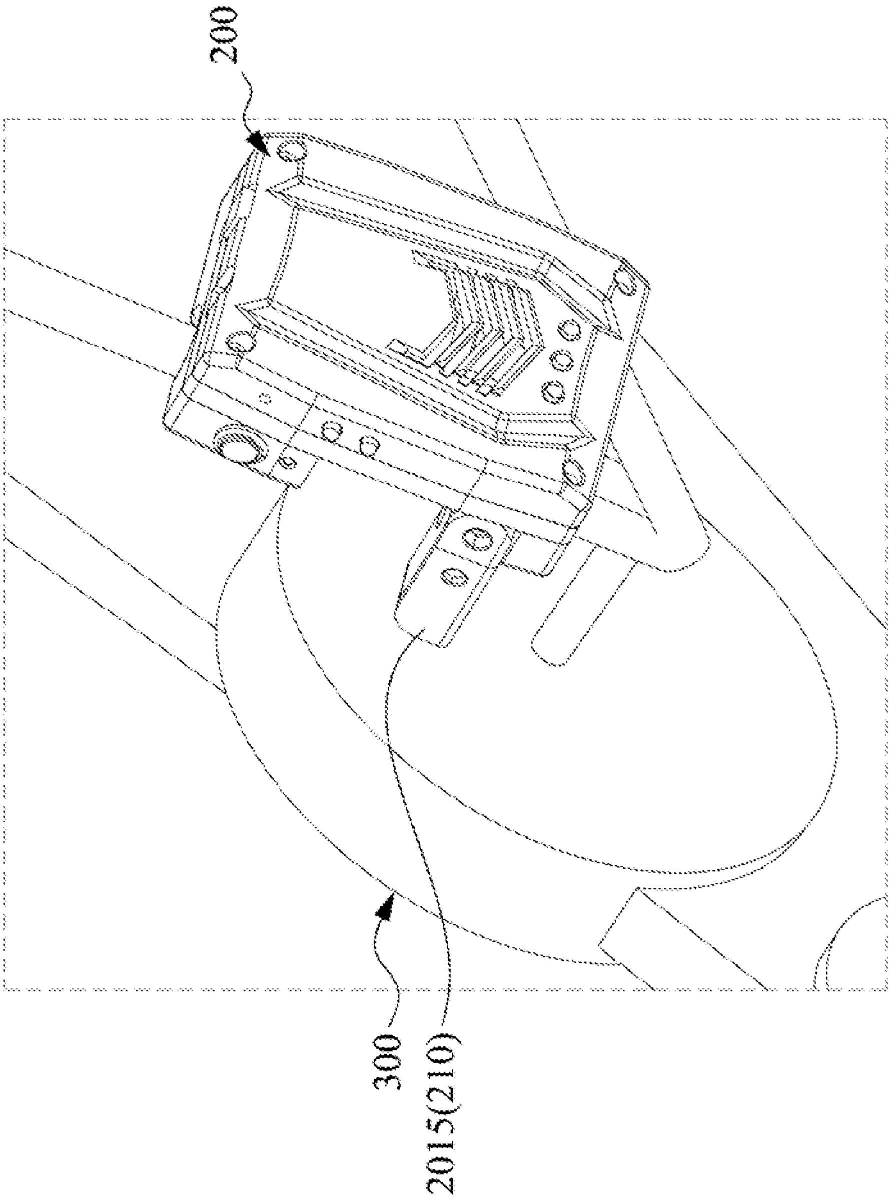
FIG. 14 depicts a schematic diagram of a portion of an indoor stationary bike and an environment sensing device shown in FIG. 1 according to one embodiment of the present disclosure.

FIG. 13 depicts a schematic diagram of a portion of an indoor stationary bike 300 and an environment sensing device 200 shown in FIG. 1 according to one embodiment of the present disclosure. FIG. 14 depicts a schematic diagram of a portion of an indoor stationary bike 300 and an environment sensing device 200 shown in FIG. 1 according to one embodiment of the present disclosure. FIG. 13 and FIG. 14 additionally depict different perspective views of the portion of the indoor stationary bike 300 and the environment sensing device 200, so that a positional relationship between the environment sensing device 200 and the indoor stationary bike 300 is further easy to understand. Besides, please refer to FIG. 14, the rotational speed sensor 210 can be configure in the rotation sensing holder 2015. When the rotational speed sensor 210 needs to be used to sense a rotational speed of the rear wheel, the rotation sensing holder 2015 can be rotated out to make it close to the rear wheel, so that the rotational speed sensor 210 can further accurately sense the rotational speed of the rear wheel.

Figure 15A:
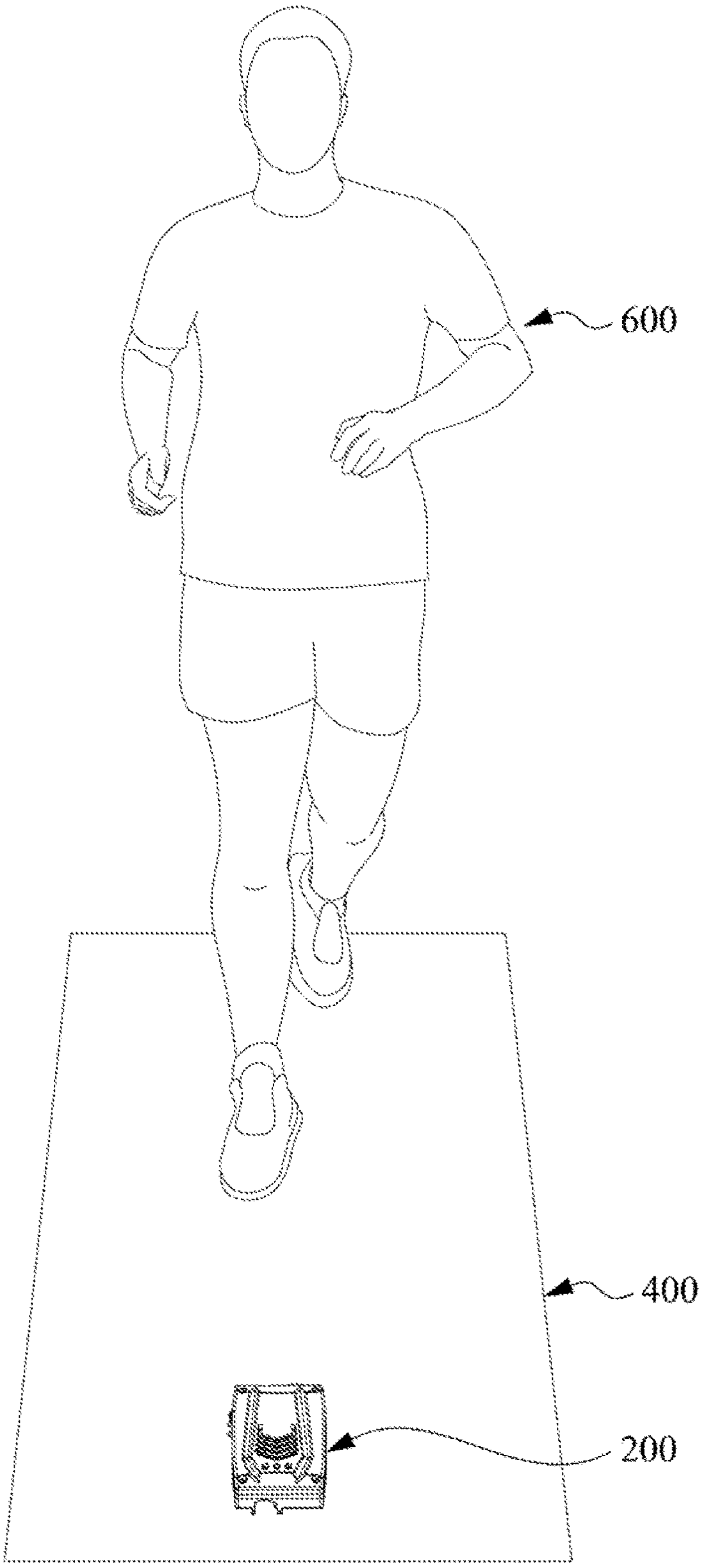
FIG. 15A depicts a schematic diagram of a running mat and an environment sensing device shown in FIG. 1 according to one embodiment of the present disclosure.

FIG. 15A depicts a schematic diagram of a running mat 400 and an environment sensing device 200 as shown in FIG. 1 according to one embodiment of the present disclosure. As shown in the figure, the environment sensing device 200 can be placed on the running mat 400. When the user 600 runs on the running mat 400, the vibration sensor 230 of the environment sensing device 200 in FIG. 8 can sense a vibration generated by the user 600 running and output the at least one environment sensing signal to the processor 110 in FIG. 2. The processor 110 correspondingly generates the rotational speed control signal to the driving circuit 132 in FIG. 3A based on the at least one environment sensing signal, and make the driving circuit 132 control the rotational speed of the fan 133 based on the rotational speed control signal. In this way, once the user 600 runs on the running mat 400, the fan 133 of the motion sensing fan module 130 will provide the user 600 with the feeling of the breeze blowing like outdoor running, thus providing the more immersive experience for the user 600.

Figure 15B:
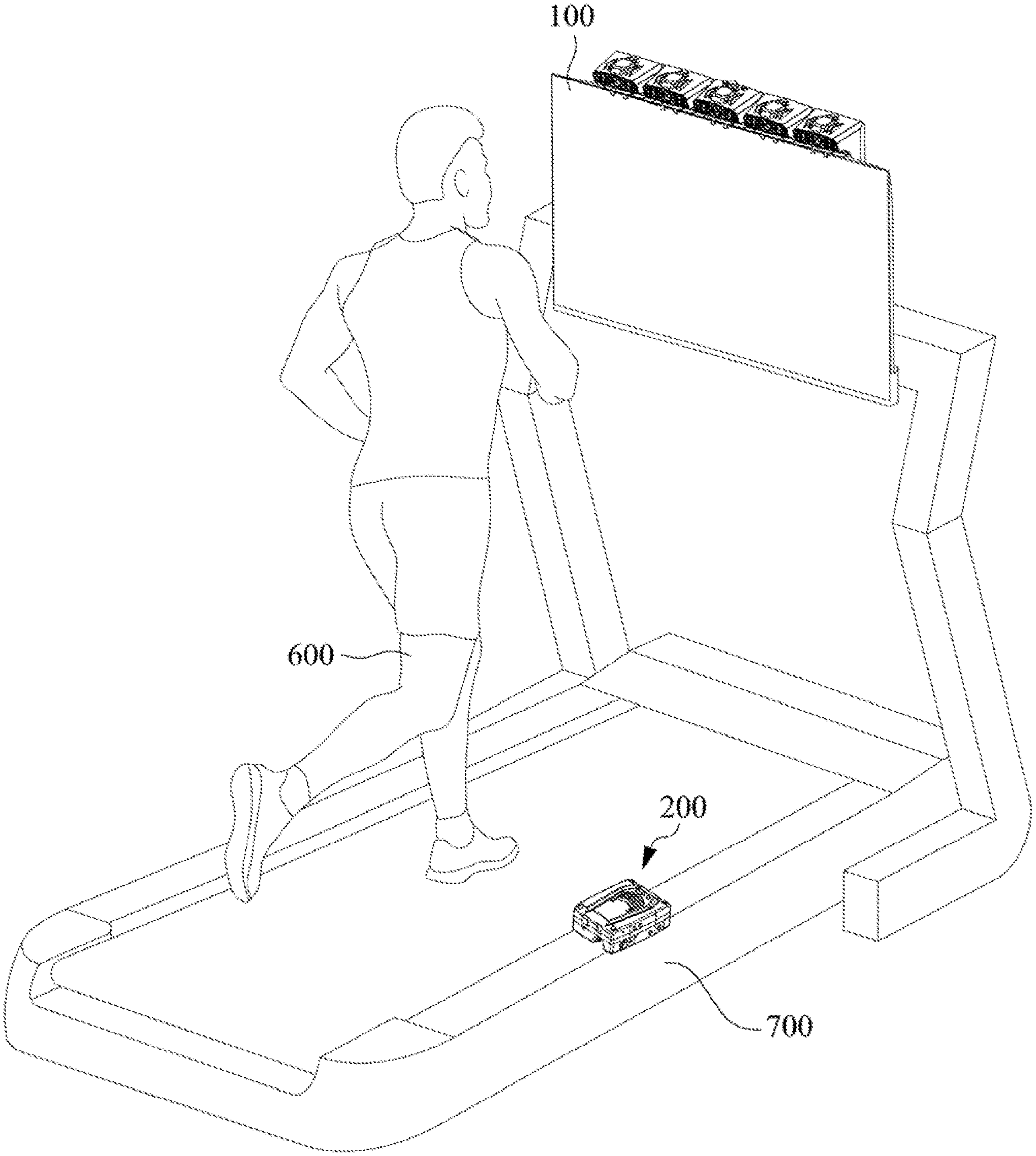
FIG. 15B depicts a schematic diagram of a television, an environment sensing device, and a treadmill according to one embodiment of the present disclosure.

FIG. 15B depicts a schematic diagram of a television 100, an environment sensing device 200, and a treadmill 700 according to one embodiment of the present disclosure. As shown in the figure, the television 100 can be placed on the treadmill 700, and the environment sensing device 200 can also be placed on the treadmill 700. When the user 600 is running on the treadmill 700, the vibration sensor 230 of the environment sensing device 200 in FIG. 8 can sense the vibration generated by the user 600 running and output the at least one environment sensing signal to the processor 110 in FIG. 2. The processor 110 correspondingly generates the rotational speed control signal to the driving circuit 132 in FIG. 3A based on the at least one environment sensing signal, and make the driving circuit 132 control the rotational speed of the fan 133 based on the rotational speed control signal. In this way, once the user 600 runs on the treadmill 700, the fan 133 of the motion sensing fan module 130 will provide the user 600 with a sensation of the breeze blowing like outdoor running, enabling a more immersive experience for the user 600.

It should be noted that the structures and operations shown in FIGS. 9 to 15B are for illustrative purposes only and do not limit the present disclosure. They are intended to facilitate understanding of one of the embodiments of the present disclosure. The scope of the present disclosure's patent shall be determined by the patent scope of the present disclosure application. Those skilled in the art may modify and embellish the embodiment of the present disclosure without departing from the spirit of the present disclosure. Such modifications and embellishments still fall within the scope of the patent application for the present disclosure.

Figure 16:
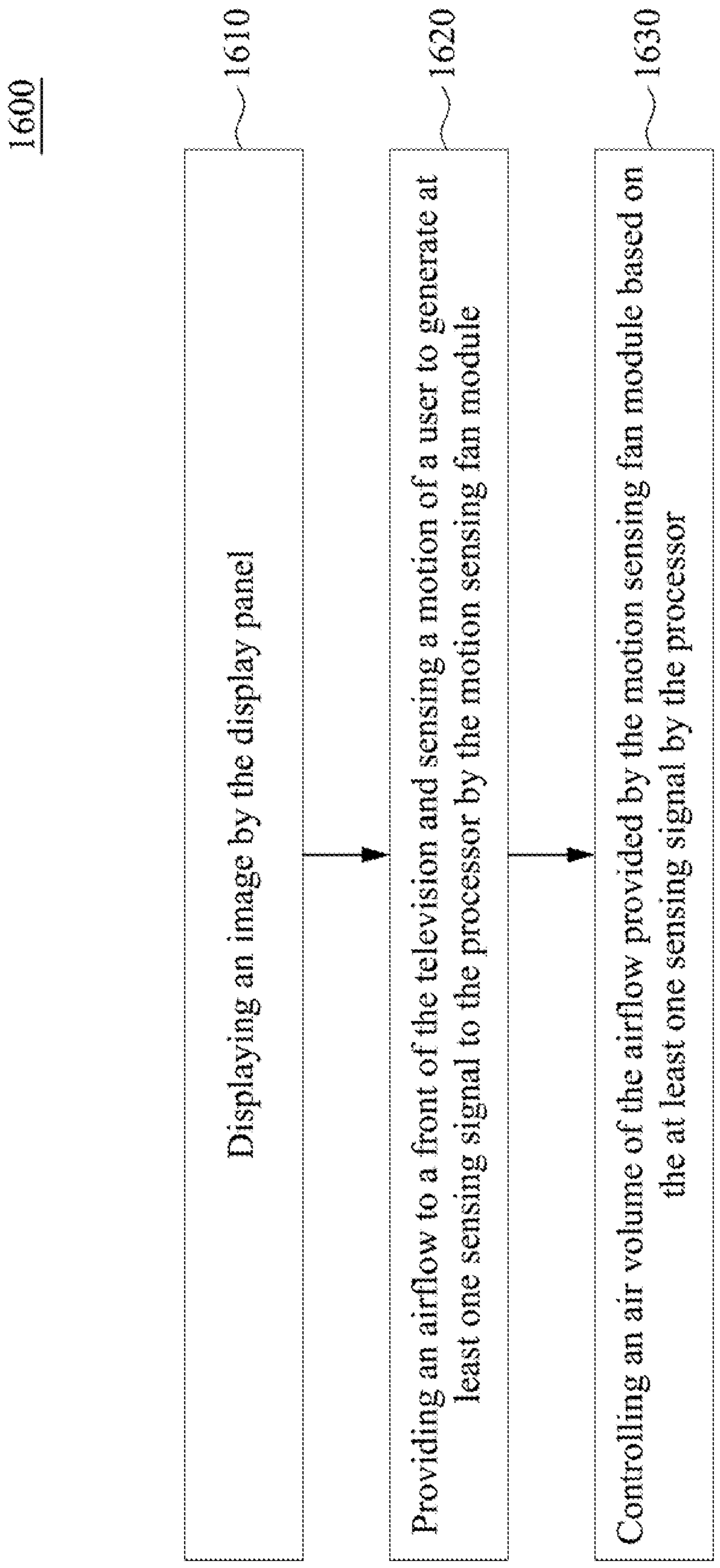
FIG. 16 depicts a schematic flowchart of a control method according to one embodiment of the present disclosure.

FIG. 16 depicts a schematic flowchart of a control method 1600 according to one embodiment of the present disclosure. In order to make the control method 1600 in FIG. 16 easy to understand, please refer to FIG. 2. The control method 1600 can be used in the control television 100, and the control method 1600 includes steps 1610, 1620, and 1630, which are described in detail below.

Please refer to the step 1610, displaying an image by the display panel 120.

Please refer to the step 1620, providing an airflow to a front of the television 100 and sensing a motion of a user to generate at least one sensing signal to the processor 110 by the motion sensing fan module 130. For example, the motion sensing fan module 130 can be used to sense the motion of the user, such as sensing the user's waving, running . . . etc., and generate the at least one sensing signal to the processor 110.

Please refer to the step 1630, controlling an air volume of the airflow provided by the motion sensing fan module 130 based on the at least one sensing signal by the processor 110. For example, the motion sensing fan module 130 can generate the at least one sensing signal based on an amount of the motion of the user, then the processor 110 control the motion sensing fan module 130 based on the at least one sensing signal to generate different air volume of the airflow.

In one embodiment, please refer to FIG. 2 and FIG. 3A, the step 1620 of the control method 1600 can respectively sense the motion of the user by the plurality of sensor 131, 137 of the motion sensing fan module 130. When one of the plurality of sensors 131, 137 senses the motion of the user, a sensing signal is correspondingly outputted to the processor 110, and the processor 110 correspondingly generates a rotational speed control signal based on a number of the sensing signal(s) obtained by the processor. Subsequently, determining the rotational speed of the fan 133 of the motion sensing fan module 130 based on the rotational speed control signal by the driving circuit 132 of the motion sensing fan module 130.

In another embodiment, please refer to FIGS. 2 and 3A, the control method 1600 further can output the laser beam control signal by the processor 110, and project the plurality of laser beams to display the motion area based on the laser beam control signal by the laser device 134 of the motion sensing fan module 130.

In one embodiment, please refer to FIG. 8, control method 1600 further can sense the motion of the user by at least one environment sensor to output at least one environment sensing signal to the processor 110 in FIG. 2, and correspondingly generate the rotational speed control signal to the driving circuit 132 in FIG. 3A based on the at least one environment sensing signal by the processor 110, and make the driving circuit 132 control the rotational speed of the fan 133 based on the rotational speed control signal.

In another embodiment, please refer to FIG. 8, the at least one environment sensor includes at least one of the rotational speed sensor 210 and the vibration sensor 230. In one embodiment, please refer to FIG. 2 and FIG. 8, the at least one environment sensor is wired or wirelessly coupled to the processor 110.

The aforementioned control method 1600 can be implemented as a computer program and stored in a computer readable medium, so that the computer reads the recording medium and then executes the aforementioned control method 1600. The computer readable medium can be a read only memory, a flash memory, a floppy disk, a hard disk, an optical disk, a pen drive, a tape, a database that can be accessed by a network or those who are familiar with this technology can easily think of the computer readable medium with the same function. The aforementioned control method 1600 can also be implemented by integrating the computer program with more than one processor or chip.

It should be noted that the operations shown in FIG. 16 are provided for illustrative purposes only, and the present disclosure is not limited to those operations. The operations are merely intended to illustrate one possible embodiment of the present disclosure to facilitate a better understanding of the technology. The scope of the present disclosure shall be determined by the claims of the present patent application. Modifications and refinements made by those skilled in the art to the embodiments of the present disclosure, without departing from the spirit of the present disclosure, still fall within the scope of the invention claimed in the present patent application.

It can be seen from the above implementation of the present disclosure that the application of the present disclosure has the following advantages. The television, the motion sensing fan assembly, the control method, and the computer readable medium of the present disclosure can simulate outdoor cycling, running, etc. when it rains, so that users can still team up with others to enjoy the fun of outdoor cycling, running, etc. when it rains . Besides, the television, the motion sensing fan assembly, the control method, and the computer readable medium of the present disclosure can provide the corresponding airflow according to the user's state of riding indoor stationary bike, running, etc., so that the user further can experience the feeling of being on the scene.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A television, comprising:

a processor receiving an audio-visual signal;

a display panel, coupled to the processor, wherein the processor transmits the audio-visual signal to the display panel to display an image; and a plurality of motion sensing fan modules coupled to the processor, wherein each of the motion sensing fan modules includes a plurality of different sensors to sense motion of a user, a driving circuit, and a fan, wherein the motion of the user comprises different actions of the user and the plurality of different sensors sense the different actions respectively to generate a plurality of sensing signals to the processor, wherein the processor correspondingly generates a rotational speed control signal based on a number of the plurality of sensing signals outputted from the plurality of different sensors, wherein the driving circuit of the motion sensing fan modules receives the rotational speed control signal and drives the fan of the motion sensing fan modules to generate an airflow corresponding to the rotational speed control signal.

2. The television of claim 1, wherein the driving circuit determines a rotational speed of the fan based on the rotational speed control signal.

3. The television of claim 1, wherein the processor further outputs a laser beam control signal, and the motion sensing fan module further comprises:

a laser device, coupled to the processor, and configured to project a plurality of laser beams to display a motion area based on the laser beam control signal.

4. The television of claim 1, wherein the processor further outputs a light control signal, and the motion sensing fan module further comprises:

an atmosphere lamp, coupled to the processor, and configured to emit an atmosphere light based on the light control signal.

5. The television of claim 1, further comprising:

at least one environment sensor, coupled to the processor, and configured to sense the motion of the user to output at least one environment sensing signal to the processor, wherein the processor correspondingly generates the rotational speed control signal to the driving circuit based on the at least one environment sensing signal, and make the driving circuit control the rotational speed of the fan based on the rotational speed control signal.

6. The television of claim 5, wherein the at least one environment sensor comprises at least one of a rotational speed sensor and a vibration sensor.

7. The television of claim 5, wherein the at least one environment sensor transmits the at least one environment sensing signal to the processor through a wired manner or a wireless manner.

8. The television of claim 5, wherein the at least one environment sensor is attached to a treadmill or a stationary bicycle.

9. A control method, configured to control a television, wherein the television comprises a processor, a display panel, and a motion sensing fan module, and the processor is coupled to the display panel and the motion sensing fan module, wherein the control method comprises:

displaying an image by the display panel, wherein the processor receives an audio-visual signal and transmits the audio-visual signal to the display panel to display the image;

providing an airflow towards a front of the television and sensing a motion of a user to generate at least one sensing signal to the processor by the motion sensing fan module, comprises:

respectively sensing the motion of the user by a plurality of different sensors of the motion sensing fan module, wherein the motion of the user comprises different actions of the user and the plurality of different sensors sense the different actions respectively to generate a plurality of sensing signals to the processor;

correspondingly generating, by the processor, a rotational speed control signal based on a number of the plurality of sensing signals outputted from the plurality of different sensors; and determining a rotational speed of a fan of the motion sensing fan module based on the rotational speed control signal by a driving circuit of the motion sensing fan module; and controlling an air volume of the airflow provided by the motion sensing fan module based on the at least one sensing signal by the processor.

10. The control method of claim 9, further comprising:

outputting a laser beam control signal by the processor; and projecting a plurality of laser beams to display a motion area based on the laser beam control signal by a laser device of the motion sensing fan module.

11. The control method of claim 9, further comprising:

sensing the motion of the user by at least one environment sensor to output at least one environment sensing signal to the processor; and correspondingly generating the rotational speed control signal to the driving circuit based on the at least one environment sensing signal by the processor, and making the driving circuit control the rotational speed of the fan based on the rotational speed control signal.

12. The control method of claim 11, wherein the at least one environment sensor comprises at least one of a rotational speed sensor and a vibration sensor.

13. The control method of claim 12, wherein the at least one environment sensor transmits the at least one environment sensing signal to the processor through a wired manner or a wireless manner.

14. The control method of claim 11, wherein the at least one environment sensor is attached to a treadmill or a stationary bicycle.

15. A non-transitory computer readable storage medium storing a computer program for performing a control method, wherein the control method is configured to control a television, wherein the television comprises a processor, a display panel, and a motion sensing fan module, and the processor is coupled to the display panel and the motion sensing fan module, wherein the control method comprises:

displaying an image by the display panel, wherein the processor receives an audio-visual signal and transmits the audio-visual signal to the display panel to display the image;

providing an airflow to a front of the television and sensing a motion of a user to generate at least one sensing signal to the processor by the motion sensing fan module, comprises:

respectively sensing the motion of the user by a plurality of different sensors of the motion sensing fan module, wherein the motion of the user comprises different actions of the user and the plurality of different sensors sense the different actions respectively to generate a plurality of sensing signals to the processor;

correspondingly generating, by the processor, a rotational speed control signal based on a number of the plurality of sensing signals outputted from the plurality of different sensors; and determining a rotational speed of a fan of the motion sensing fan module based on the rotational speed control signal by a driving circuit of the motion sensing fan module; and controlling an air volume of the airflow provided by the motion sensing fan module based on the at least one sensing signal by the processor.

16. The non-transitory computer readable storage medium of claim 15, wherein the control method further comprises:

outputting a laser beam control signal by the processor; and projecting a plurality of laser beams to display a motion area based on the laser beam control signal by a laser device of the motion sensing fan module.

17. The non-transitory computer readable storage medium of claim 15, wherein the control method further comprises:

sensing the motion of the user by at least one environment sensor to output at least one environment sensing signal to the processor; and correspondingly generating the rotational speed control signal to the driving circuit based on the at least one environment sensing signal by the processor, and making the driving circuit control the rotational speed of the fan based on the rotational speed control signal.

18. The non-transitory computer readable storage medium of claim 17, wherein the at least one environment sensor is attached to a treadmill or a stationary bicycle.

* * * * *